US012381360B2

(12) United States Patent
Streckewald et al.

(10) Patent No.: US 12,381,360 B2
(45) Date of Patent: Aug. 5, 2025

(54) ELECTRICAL SHIELDING FOR WAFER ASSEMBLY OF ELECTRICAL CONNECTOR ASSEMBLY

(71) Applicant: TE Connectivity Solutions GmbH, Schaffhausen (CH)

(72) Inventors: Michael Streckewald, Harrisburg, PA (US); Julia Anne Lachman, York, PA (US)

(73) Assignee: TE CONNECTIVITY SOLUTIONS GmbH, Schaffhausen (CH)

( * ) Notice: Subject to any disclaimer, the term of this patent is extended or adjusted under 35 U.S.C. 154(b) by 332 days.

(21) Appl. No.: 18/190,243

(22) Filed: Mar. 27, 2023

(65) Prior Publication Data

US 2024/0332868 A1 Oct. 3, 2024

(51) Int. Cl.

*H01R 13/6586* (2011.01)
*H01R 9/05* (2006.01)
*H01R 13/6592* (2011.01)

(52) U.S. Cl.

CPC ....... *H01R 13/6586* (2013.01); *H01R 9/0518* (2013.01); *H01R 13/6592* (2013.01)

(58) Field of Classification Search

CPC .............. H01R 13/6586; H01R 9/0518; H01R 13/6592; H01R 13/6581; H01R 13/514
See application file for complete search history.

(56) References Cited

U.S. PATENT DOCUMENTS

| | | | | |
|---|---|---|---|---|
| 11,381,038 | B1 * | 7/2022 | Patel | H01R 13/65914 |
| 2004/0002262 | A1 * | 1/2004 | Murayama | H01R 13/65918 439/607.1 |
| 2017/0279219 | A1 * | 9/2017 | Humbert | H01R 13/5825 |
| 2018/0337483 | A1 * | 11/2018 | Henry | H01R 12/714 |
| 2019/0044285 | A1 * | 2/2019 | Dunham | H01R 12/716 |

* cited by examiner

*Primary Examiner* — Travis S Chambers

(57) ABSTRACT

An electrical connector assembly includes a housing having a mating interface configured to be mated with a mating electrical connector assembly. Wafer assemblies are received in a cavity of the housing arranged in a wafer stack. Each wafer assembly includes a leadframe, a wafer body holding the leadframe, cables coupled to the leadframe, a ground frames coupled to the wafer body to provide electrical shielding for the leadframe, and ferrules surrounding the ends of the cables and electrically connected to the ground frames. Each ferrule has a solder layer along an interior of the ferrule coupled to a cable shield. Each ferrule includes shield connecting elements terminated to the ground frames to electrically connect the ferrule to the ground frames.

22 Claims, 7 Drawing Sheets

ELECTRICAL SHIELDING FOR WAFER ASSEMBLY OF ELECTRICAL CONNECTOR ASSEMBLY

BACKGROUND OF THE INVENTION

The subject matter herein relates generally to electrical connectors for a communication system.

Communication systems use electrical connectors to electrically connect various components to allow data communication between the components. For example, electrical connectors may be directly mated together. The electrical connectors typically include a plug connector and a receptacle connector. The connectors may be cable connectors having high speed differential cables terminated to the signal conductors of the connectors. The signal conductors of the two electrical connectors transition between the two connectors. For high-speed connectors, shielding is required, adding to the complexity of the connector designs. However, as data rates increase, conventional shielding is insufficient. For example, at interfaces between the cables and the signal conductors of the connectors signal integrity problems are common.

A need remains for a reliable electrical connector having sufficient electrical shielding for high speed applications.

BRIEF DESCRIPTION OF THE INVENTION

In one embodiment, a connector assembly including wafer assemblies for an electrical connector is provided. The wafer assembly includes a leadframe having signal contacts that extend between mating ends and terminating ends. The signal contacts have main bodies between the mating ends and the terminating ends. The wafer assembly includes cables rearward of the leadframe. Each cable includes first and second signal conductors arranged as a signal pair. The first and second signal conductors are terminated to the terminating ends of the corresponding signal contacts. Each cable includes a cable shield at an end of the cable providing shielding for the signal pair. The wafer assembly includes a wafer body holding the main bodies of the signal contacts. The wafer body has a front, a rear, a first side between the front and the rear, and a second side between the front and the rear. The cables are located rearward of the rear of the wafer body. The wafer body supports the main bodies of the signal contacts. The mating ends extend forward of the front of the wafer body. The terminating ends extend rearward of the rear of the wafer body. The wafer assembly includes a first ground frame coupled to the first side of the wafer body to provide electrical shielding for the leadframe. The first ground frame includes first ground shields providing shielding for the mating ends of the corresponding signal contacts. The first ground frame includes first termination tabs. The wafer assembly includes a second ground frame coupled to the second side of the wafer body to provide electrical shielding for the leadframe. The second ground frame includes second termination tabs. The wafer assembly includes ferrules surrounding the cable shields at the ends of the corresponding cables. Each ferrule has a solder layer inside the ferrule soldered to the cable shield of the corresponding cable. The ferrules are terminated to the corresponding first termination tabs of the first ground frame and the corresponding second termination tabs of the second ground frame to electrically connect the ferrules to the first and second ground frames.

In another embodiment, a cable assembly for a wafer assembly is provided. The cable assembly includes a cable including first and second signal conductors arranged as a signal pair. Terminating ends of the first and second signal conductors extend from an end of the cable for termination to terminating ends of signal contacts of the wafer assembly. The cable includes a cable shield providing shielding for the signal pair. The cable shield exposed at the end of the cable beyond a cable jacket of the cable. The cable assembly includes a ferrule formed in an obround shape surround a ferrule chamber. The ferrule chamber receiving the end of the cable and the exposed ends of the first and second signal conductors. The ferrule has a circumferential gap in the ferrule chamber surround the end of the cable. The ferrule includes shield connecting elements at a front of the ferrule configured to be terminated to a first ground shield and a second ground shield of the wafer assembly on opposite sides of the wafer assembly. The cable assembly includes a solder layer in the gap on an interior surface of the ferrule. The solder layer electrically connects the cable shield to the ferrule.

In a further embodiment, an electrical connector assembly is provided and includes a housing having a mating interface configured to be mated with a mating electrical connector assembly. The housing has a cavity. The electrical connector assembly includes wafer assemblies received in the cavity and coupled to the housing. The wafer assemblies are arranged in a wafer stack. Each wafer assembly includes a leadframe, a wafer body holding the leadframe, cables coupled to the leadframe, a first ground frame coupled to the wafer body to provide electrical shielding for the leadframe, a second ground frame coupled to the wafer body to provide electrical shielding for the leadframe, and ferrules surround the ends of the cables. Each ferrule has a solder layer along an interior of the ferrule. The solder layer is coupled to a cable shield of the corresponding cable to electrically connect the cable shield to the ferrule. Each ferrule includes shield connecting elements are terminated to the first and second ground frames to electrically connect the ferrule to the first and second ground frames, and wherein the first ground frame is configured to be coupled to the mating electrical connector assembly and the second ground frame is configured to be coupled to the mating electrical connector assembly.

DETAILED DESCRIPTION OF THE INVENTION

Figure 1:
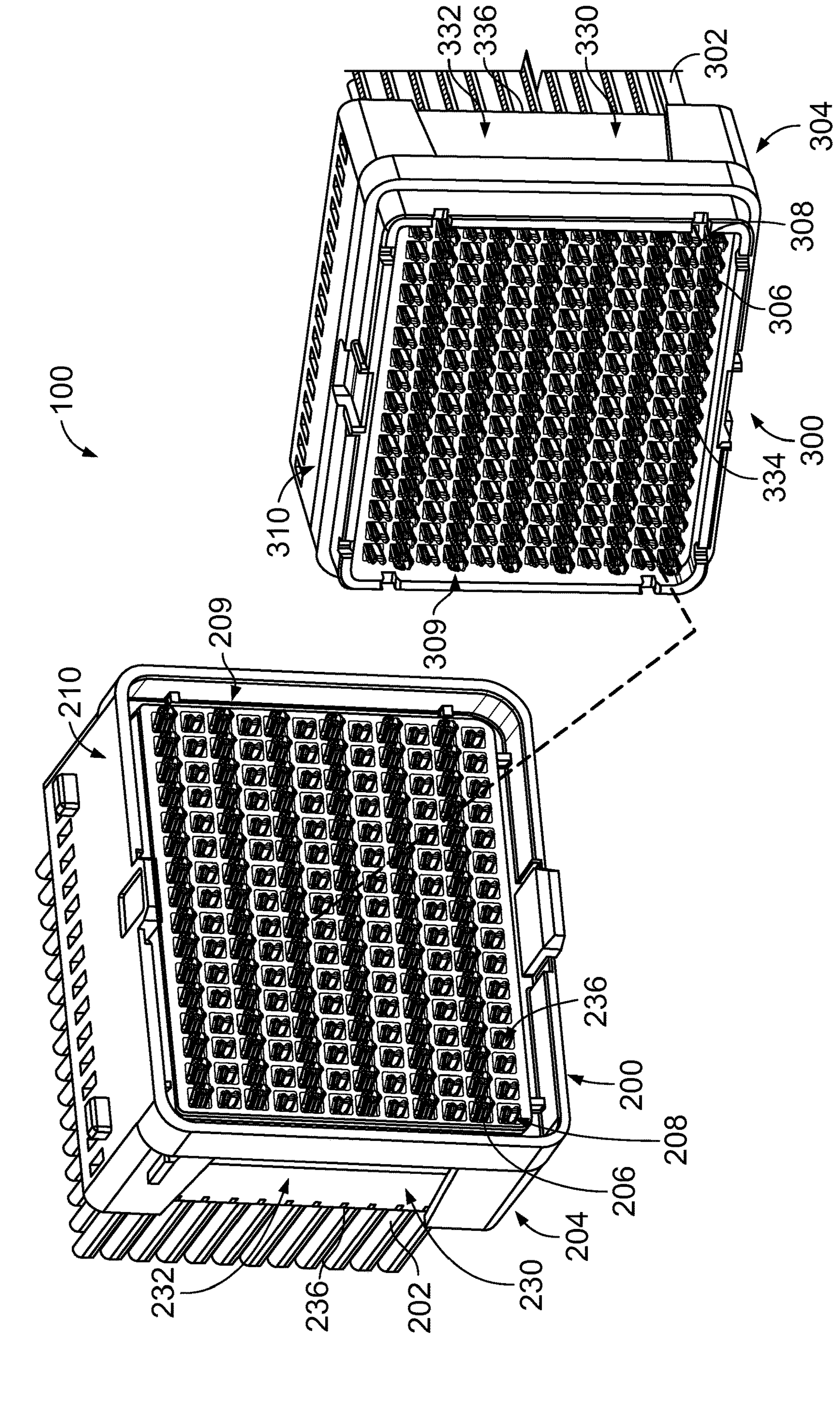
FIG. 1 illustrates a communication system in accordance with an exemplary embodiment.

FIG. 1 illustrates a communication system 100 in accordance with an exemplary embodiment. The communication system 100 includes a first electrical connector assembly 200 and a second electrical connector assembly 300 configured to be electrically coupled together. In various embodiments, the communication system 100 may be a server or network switch. In other various embodiments, the communication system 100 may be a backplane system. In various embodiments, the first and second electrical connector assemblies 200, 300 are cable connector assemblies. However, in alternative embodiments, the first electrical connector assembly 200 and/or the second electrical connector assembly 300 may be a circuit board connector mounted to a circuit board.

In an exemplary embodiment, the first and second electrical connector assemblies 200, 300 are directly mated together. For example, the first electrical connector assembly 200 may be plugged into the second electrical connector assembly 300 and/or the second electrical connector assembly 300 may be plugged into the first electrical connector assembly 200. The first and second electrical connector assemblies 200, 300 are mated at a separable mating interface. The first and second electrical connector assemblies 200, 300 are directly mated together without the use of an adapter or additional electrical connector therebetween.

The first electrical connector assembly 200 includes first cables 202 terminated to a first electrical connector 204. The first electrical connector 204 includes first signal contacts 206 and first shield structures 208 providing electrical shielding for the first signal contacts 206.

The second electrical connector assembly 300 includes second cables 302 terminated to a second electrical connector 304. The second electrical connector 304 includes second signal contacts 306 and second shield structures 308 providing electrical shielding for the second signal contacts 306.

In an exemplary embodiment, the first and second electrical connectors 204, 304 have hermaphroditic mating interfaces defined, at least in part, by the signal contacts 206, 306 and the shield structures 208, 308. For example, the first and second electrical connectors 204, 304 may include both male mating portions and female mating portions that are co-nested during mating to electrically connect the first and second electrical connectors 204, 304. In various embodiments, the first and second electrical connectors 204, 304 may be identical to each other allowing use of the same parts in both the first and second electrical connectors 204, 304. However, in alternative embodiments, the first and second electrical connectors 204, 304 are not identical but rather have complementary mating interfaces.

In an exemplary embodiment, the signal contacts 206, 306 are arranged in rows and columns. The first signal contacts 206 are arranged for direct mating with the second signal contacts 306 when the first and second electrical connectors 204, 304 are mated. The shield structures 208, 308 provide electrical shielding around the signal contacts 206, 306 at the mating interfaces between the signal contacts 206, 306. In an exemplary embodiment, the first signal contacts 206 and the first shield structures 208 are pluggable into the second electrical connector 304. The second signal contacts 306 and the second shield structures 308 are pluggable into the first electrical connector 204. The communication system 100 is a direct plug communication system. The shield structures 208, 308 may provide circumferential shielding around the signal contacts 206, 306 at the mating interfaces. The shield structures 208, 308 may provide circumferential shielding along the signal paths between the first cables 202 and the second cables 302. Optionally, the circumferential shielding may be 360° shielding along the signal paths between the first cables 202 and the second cables 302 for improved signal integrity through the first and second electrical connectors 204, 304.

The signal contacts 206, 306 define electrical paths between the cables 202, 302. The signal contacts 206, 306 mate at a separable mating interface between the first and second electrical connectors 204, 304. For example, the mating interfaces of the signal contacts 206, 306 are arranged along mating planes (for example, parallel to the columns). In various embodiments, the first signal contacts 206 are arranged in pairs and the second signal contacts 306 are arranged in pairs. The shield structures 208, 308 cooperate to provide shielding for the corresponding signal contacts 206, 306 (for example, pairs of the signal contacts 206, 306). The shield structures 208, 308 may be electrically connected to cable shields of the cables 202, 302 to continue shielding along the signal paths between the cables 202, 302. The shield structures 208, 308 may be electrically connected to shielding structures passing through the electrical connectors 204, 304.

The first electrical connector 204 includes a housing 210 having a mating interface configured to be mated with the second electrical connector 304. The mating interface is provided at a front of the housing 210. In an exemplary embodiment, the first electrical connector 204 includes a plurality of wafers assemblies 230 coupled to the housing 210. The wafers assemblies 230 are received in a cavity 209 of the housing 210. The wafer assemblies 230 include the signal contacts 206 and the shield structures 208. The cables 202 are configured to be terminated to corresponding wafer assemblies 230. For example, the wafer assemblies 230 may support the cables 202 and signal conductors of the cables 202, which are soldered or otherwise terminated to corresponding signal contacts 206. The cables 202 may extend into the cavity 209. In an exemplary embodiment, the wafer assemblies 230 are oriented vertically. However, other orientations are possible in alternative embodiments. Each wafer assembly 230 includes a corresponding column of the signal contacts 206. The wafer assemblies 230 are stacked in the housing 210 to arrange the signal contacts 206 in rows.

In an exemplary embodiment, the wafer assemblies 230 are arranged in a wafer stack 232. For example, the wafer assemblies 230 are parallel to each other in the wafer stack 232. The wafer stack 232 extends from a rear of the housing 210. Optionally, the wafer assemblies 230 may be individually loaded into the housing 210, such as into the cavity 209 at a rear of the housing 210. Alternatively, the wafer assemblies 230 may be assembled together in the wafer stack 232, and the wafer stack 232 is then loaded into the rear of the housing 210 as a unit.

In an exemplary embodiment, each wafer assembly 230 extends between a mating end 234 and a terminating end 236. The cables 202 are terminated to the wafer assembly

230 at the terminating end 236. The mating end 234 extends into the housing 210 and is configured to be mated with the second electrical connector 304. In various embodiments, the wafer assembly 230 may be a right-angle wafer assembly having the mating end 234 at a right angle relative to the terminating end 236. The shield structures 208 are provided at the mating end 234 and are configured to be mated with the second electrical connector 304.

The second electrical connector 304 includes a housing 310 having a mating interface configured to be mated with the first electrical connector 204. The mating interface is provided at a front of the housing 310. In an exemplary embodiment, the second electrical connector 304 includes a plurality of wafer assemblies 330 coupled to the housing 310. The wafers assemblies 330 are received in a cavity 309 of the housing 310. The wafer assemblies 330 include the signal contacts 306 and the shield structures 308. The cables 302 are terminated to the corresponding wafer assemblies 330. For example, conductors of the cables 302 may be soldered or welded to the signal contacts 306. The cables 302 may extend into the cavity 309. In an exemplary embodiment, the wafer assemblies 330 are oriented vertically. However, other orientations are possible in alternative embodiments. Each wafer assembly 330 includes a corresponding column of the signal contacts 306. The wafer assemblies 330 are stacked in the housing 310 to arrange the signal contacts 306 in rows.

In an exemplary embodiment, the wafer assemblies 330 are arranged in a wafer stack 332. For example, the wafer assemblies 330 are parallel to each other in the wafer stack 332. The wafer stack 332 extends from a rear of the housing 310. Optionally, the wafer assemblies 330 may be individually loaded into the housing 310, such as into the cavity 309 at a rear of the housing 310. Alternatively, the wafer assemblies 330 may be assembled together in the wafer stack 332 and the wafer stack 332 is loaded into the rear of the housing 310.

In an exemplary embodiment, each wafer assembly 330 extends between a mating end 334 and a terminating end 336. The cables 302 are terminated to the wafer assembly 330 at the terminating end 336. The mating end 334 extends into the housing 310 and is configured to be mated with the first electrical connector 204. In various embodiments, the wafer assembly 330 may be a right-angle wafer assembly having the mating end 334 at a right angle relative to the terminating end 336. The shield structures 308 are provided at the mating end 334 and are configured to be mated with the first electrical connector 204.

Figure 2:
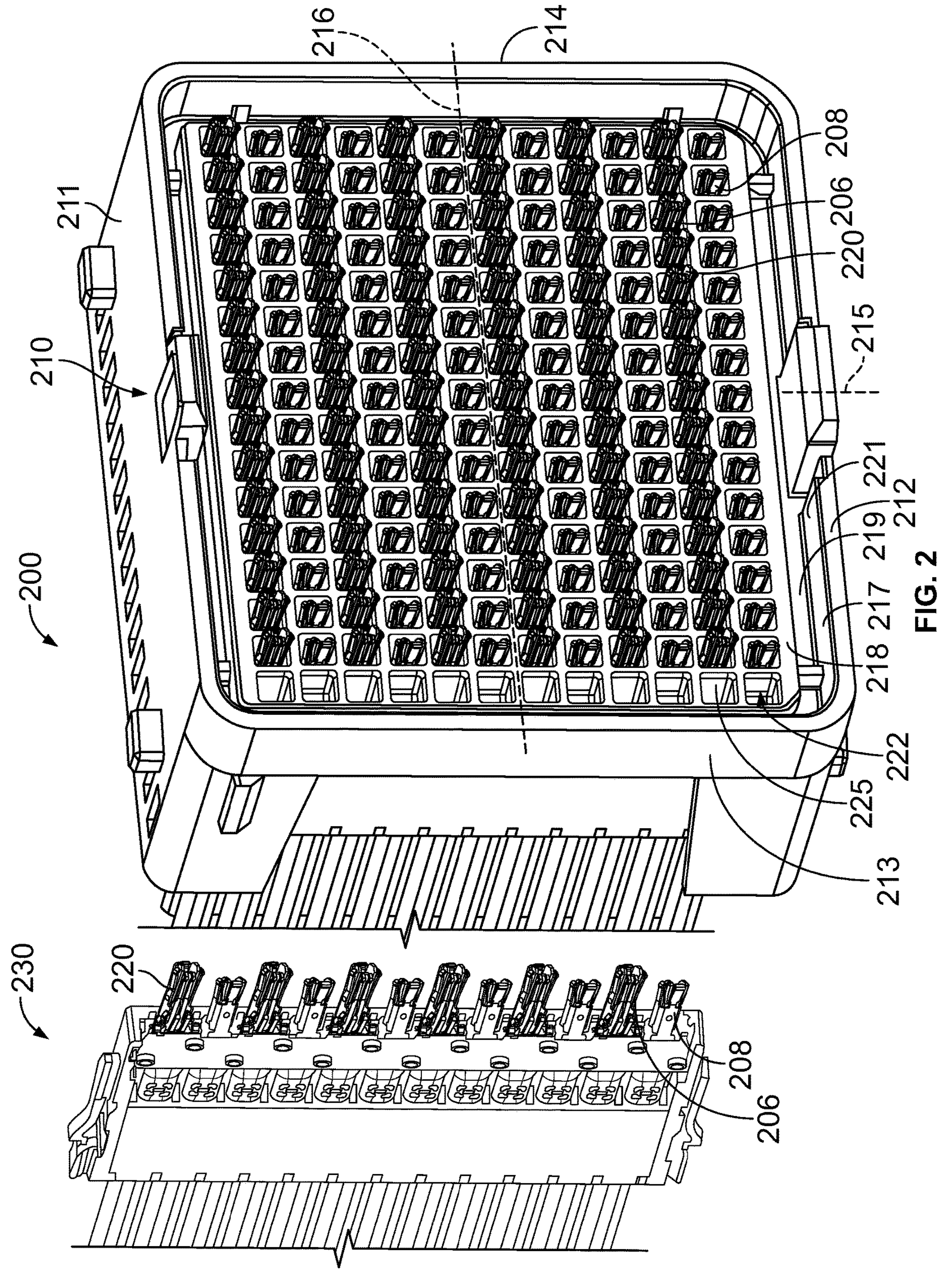
FIG. 2 is a front perspective, partially exploded view of the first electrical connector assembly in accordance with an exemplary embodiment showing the mating interface.

FIG. 2 is a front perspective, partially exploded view of the first electrical connector assembly 200 in accordance with an exemplary embodiment showing the mating interface. The second electrical connector assembly 300 (FIG. 1) may have an identical mating interface. One of the wafer assemblies 230 is shown poised for loading into the housing 210. The housing 210 holds the signal contacts 206 and the shield structures 208 for mating with the second electrical connector 304 (shown in FIG. 1). The housing 210 forms part of the mating interface with the second electrical connector 304.

The housing 210 has a top 211 and a bottom 212. The housing 210 has a first side 213 and a second side 214 opposite the first side 213. The housing 210 has a primary axis 215 extending from top the 211 to the bottom 212 and a secondary axis 216 extending from the first side 213 to the second side 214. The secondary axis 216 is perpendicular to the primary axis 215. In an exemplary embodiment, the signal contacts 206 and the shield structures 208 are arranged in columns parallel to the primary axis 215 and rows parallel to the secondary axis 216. The mating ends 234 are arranged along mating planes parallel to the primary axis 215 for interfacing with the second contacts 306 (FIG. 1). The wafer assemblies 230 are received in the housing 210 such that the wafer assemblies 230 are oriented parallel to the primary axis 215.

In an exemplary embodiment, the housing 210 is a multi-piece housing including a contact organizer 217 and a commoning member 218. The commoning member 218 is at the front of the housing 210. The contact organizer 217 may include locating features for locating the commoning member 218 relative to the contact organizer 217. In an exemplary embodiment, the commoning member 218 faces the second electrical connector 304. The commoning member 218 is electrically conductive and is used to electrically common each of the shield structures 208. The commoning member 218 provides electrical shielding for the signal contacts 206 at the mating interface. The commoning member 218 may be electrically connected to the shield structures 308 (shown in FIG. 1) of the second electrical connector 304.

In an exemplary embodiment, the contact organizer 217 includes a base 219 and an outer shroud 221 surrounding the cavity 209. The base 219 may support towers 220 in the cavity 209. The towers 220 extend forward from the base 219. The towers 220 may be integral with the base 219, such as being co-molded with the base 219. In alternative embodiments, the towers 220 may be separate from the base 219 and loaded into the base 219. For example, the towers 220 may be part of the wafer assemblies 230. The towers 220 support the signal contacts 206 and the shield structures 208. In an exemplary embodiment, the towers 220 extend into openings 222 in the commoning member 218. The towers 220 may pass entirely through the openings 222 and extend forward of the front of the commoning member 218. The towers 220 are configured to be received in corresponding openings in a commoning member of the second electrical connector 304.

The wafer assemblies 230 are coupled to the housing 210 rearward of the base 219. The signal contacts 206 and the shield structures 208 pass through the base 219 to extend along the towers 220. The signal contacts 206 are electrically isolated from each other and from the shield structures 208 by the dielectric material of the towers 220.

The commoning member 218 is manufactured from a conductive material. For example, the commoning member 218 may be a metal block having the openings 222 formed therethrough. In alternative embodiments, the commoning member 218 may be manufactured from a conductive plastic. In other various embodiments, the commoning member 218 may be a plated plastic structure having plating at the front 224 and/or through the openings 222 and/or at the rear. The shield structures 208 are configured to be electrically connected to the commoning member 218. For example, the shield structures 208 may engage the commoning member 218 within the openings 222.

In an exemplary embodiment, the openings 222 pass entirely through the commoning member 218 and are defined by walls 225. In an exemplary embodiment, the openings 222 are rectangular. In the illustrated embodiment, the openings 222 are square shaped. However, the openings 222 may have other shapes. In an exemplary embodiment, the openings 222 are oversized relative to the towers 220. For example, each opening 222 may be sized to receive two of the towers 220 (one from the first electrical connector 204 and one from the second electrical connector 304).

Figure 3:
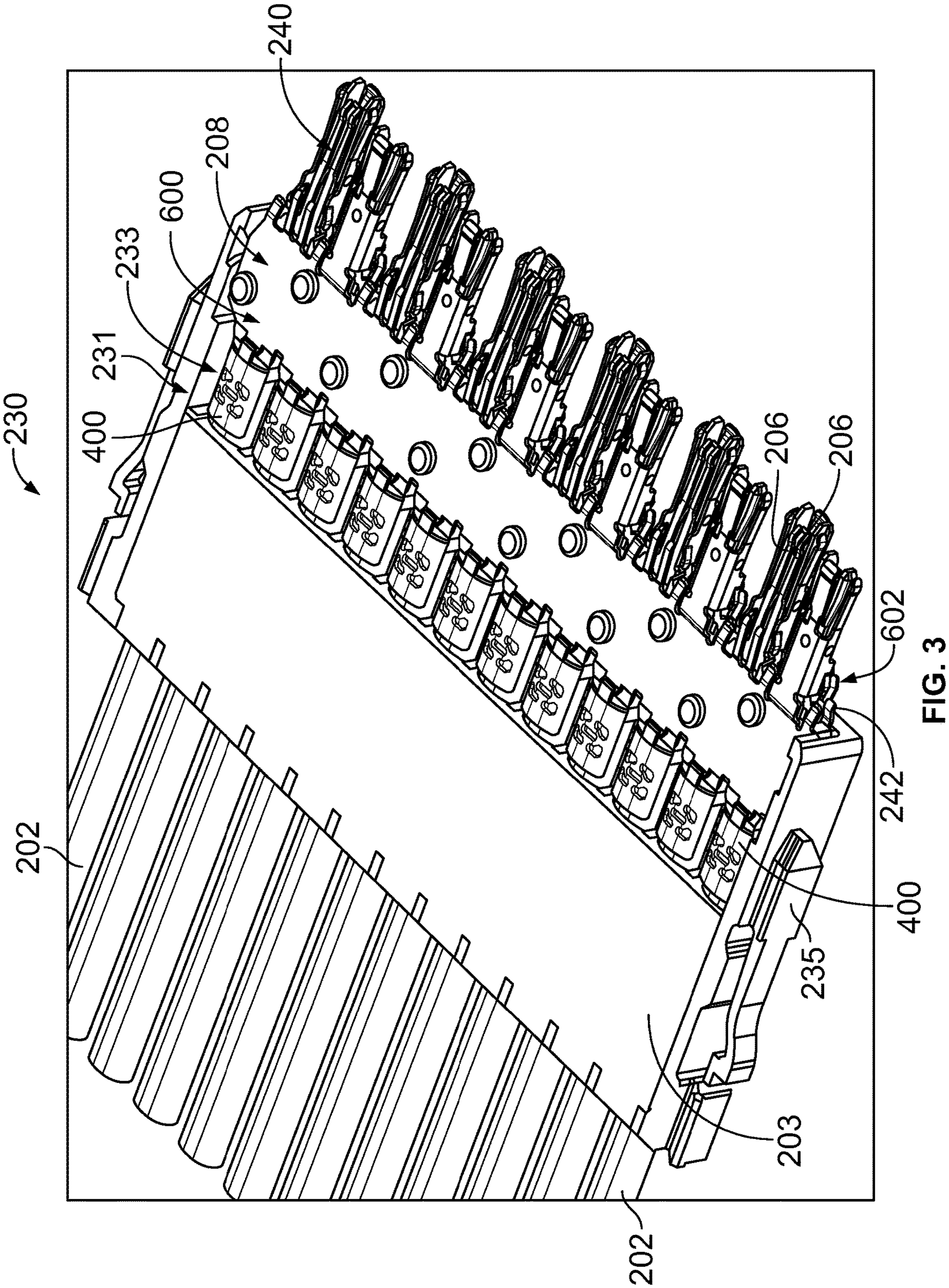
FIG. 3 is a perspective view of the wafer assembly in accordance with an exemplary embodiment.

FIG. 3 is a perspective view of the wafer assembly 230 in accordance with an exemplary embodiment. In an exemplary embodiment, the wafer assembly 230 is identical to the wafer assembly 330 (shown in FIG. 1) with both wafer assemblies 230, 330 including identical components. In an exemplary embodiment, a plurality of cable assemblies 228 are terminated to the wafer assembly 230. Each cable assembly 228 includes one of the cables 202 and a ferrule 400 coupled to the corresponding cable 202. The ferrule 400 provides electrical shielding at the end of the cable 202. The ferrule 400 is configured to be electrically connected to the shield structure 208 of the wafer assembly 230 to electrically connect the cable 202 to the shield structure 208. The ferrule 400 provides circumferential shielding around the cable 202 to the shield structure 208, such as to improve signal integrity at the transition area between the cable 202 and the wafer assembly 230.

The wafer assembly 230 includes the signal contacts 206 and the shield structures 208. The signal contacts 206 and the shield structures 208 are connected to the cables 202. In an exemplary embodiment, the wafer assembly 230 includes a leadframe 240 including the signal contacts 206. The wafer assembly 230 includes a dielectric wafer body 242 holding the leadframe 240. The wafer assembly 230 includes a first ground frame 600 coupled to a first side of the wafer body 242 and a second ground frame 602 coupled to a second side of the wafer body 242. The first and second ground frames 600, 602 form the shield structures 208. The first and second ground frames 600, 602 provide electrical shielding for the leadframe 240. The ferrules 400 are electrically connected to the first and second ground frames 600, 602 to electrically connect the cables 202 to the first and second ground frames 600, 602.

In an exemplary embodiment, the wafer assembly 230 includes a wafer frame 231 having a cavity 233. The wafer body 242 and the cables 202 are received in the cavity 233. The wafer frame 231 is used to secure the wafer assembly 230 in the housing 210 (shown in FIG. 2). The wafer frame 231 includes latches 235 to latchably secure the wafer frame 231 in the housing 210.

In an exemplary embodiment, the wafer assembly 230 includes a cable holder 203 holding the cables 202. The cable holder 203 is received in the cavity 233. In various embodiments, the cable holder 203 is an overmolded body that is overmolded over the cables 202. The cable holder 203 may be overmolded over at least portions of the ferrules 400. The cable holder 203 may be formed in place on the cables 202. The cable holder 203 may be formed in place in the cavity 233.

Figure 4:
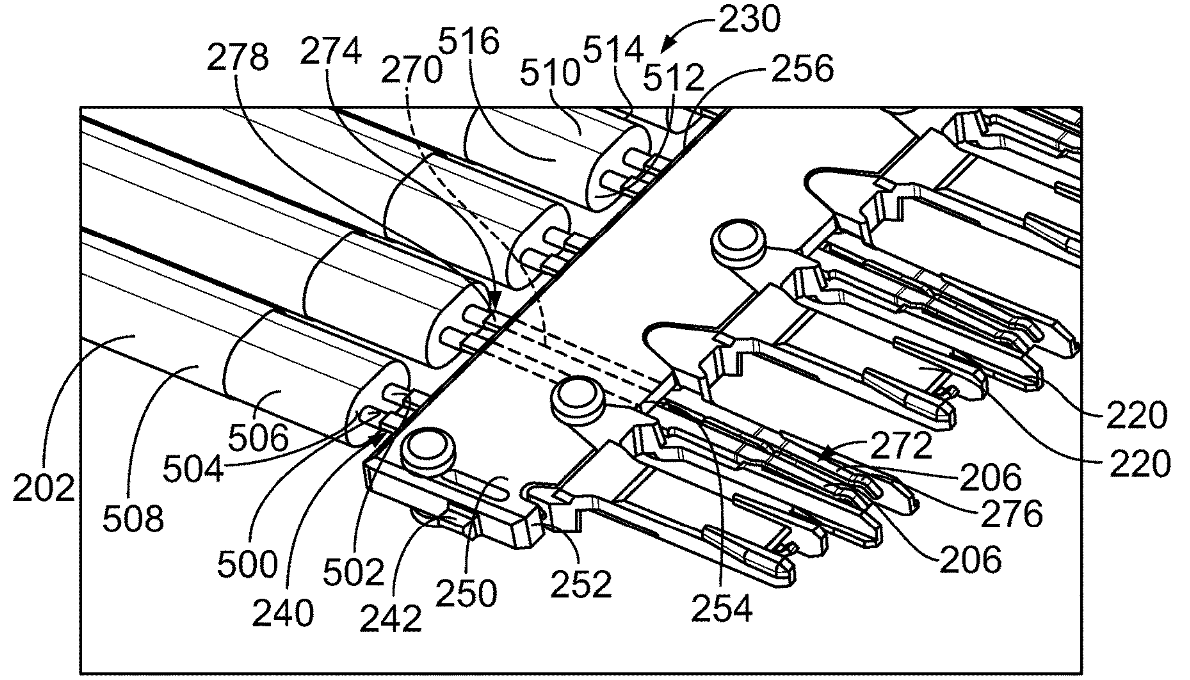
FIG. 4 is a perspective view of a portion of the wafer assembly in accordance with an exemplary embodiment, such as during an initial state of assembly.

FIG. 4 is a perspective view of a portion of the wafer assembly 230 in accordance with an exemplary embodiment, such as during an initial state of assembly. FIG. 4 shows the cables 202, the leadframe 240, the dielectric wafer body 242, and the towers 220. The cables 202 are shown terminated to the signal contacts 206 of the leadframe 240. The wafer body 242 supports the signal contacts 206 of the leadframe 240. The towers 220 extend from the wafer body 242 to support ends of the signal contacts 206.

The cables 202 are shielded cables. In an exemplary embodiment, each cable 202 is a twin-axial cable having a pair of signal conductors, namely a first signal conductor 500 and a second signal conductor 502. The signal conductors 500, 502 are arranged as a signal pair. The signal conductors 500, 502 are held by an insulator 504. A cable shield 506 surrounds the insulator 504. The cable shield 506 provides shielding for the signal pair of signal conductors 500, 502 along the length of the cable 202. A cable jacket 508 surrounds the cable shield 506. The end of the cable 202 is stripped for termination to the signal contacts 206 in a termination region in the space between the end of the cable and the leadframe.

In an exemplary embodiment, the cable 202 is oval shaped or obround to surround the signal pair of signal conductors 500, 502. In various embodiments, the cable shield 506 includes a first side 510 and a second side 512 opposite the first side 510. The cable shield 506 includes a first or upper end 514 and a second or lower end 516 opposite the first end 514. Optionally, the sides 510, 512 may be generally flat or planar. The ends 514, 516 are curved between the sides 510, 512. The cable 202 may have other shapes in alternative embodiments, such as having the sides 510, 512 curved, such as at a radius of curvature that is different from the radius of curvature of the ends 514, 516.

The leadframe 240 is a stamped and formed leadframe that forms the signal contacts 206 from a metal sheet. In an exemplary embodiment, the leadframe 240 only includes the signal contacts 206. However, in alternative embodiments, the leadframe 240 may include ground contacts arranged between corresponding signal contacts to provide electrical shielding for the signal contacts. In an exemplary embodiment, the signal contacts 206 are arranged in pairs configured to carry differential signals. However, the signal contacts 206 may be single ended signal contacts in alternative embodiments.

The wafer body 242 surrounds the signal contacts 206 and positions the signal contacts 206 relative to each other. In an exemplary embodiment, the wafer body 242 is manufactured from a dielectric material, such as a plastic material. In an exemplary embodiment, the wafer body 242 is an overmold that is overmolded around the leadframe 240. The wafer body 242 includes first and second sides 250, 252. The wafer body 242 includes a front 254 and a rear 256 extending between a top and a bottom. The front 254 defines a mating end. The signal contacts 206 extend from the wafer body 242 at the front 254 for connection to the second electrical connector 304 (shown in FIG. 1). In an exemplary embodiment, the towers 220 extend from the front 254 of the wafer body 242 to support the ends of the signal contacts 206. In the illustrated embodiment, the towers 220 are separate and discrete from the wafer body 242 and coupled thereto. In alternative embodiments, the towers 220 are integral with the wafer body 242, such as being co-molded with the wafer body 242. The rear 256 defines a cable end. The cables 202 extend from the rear 256 along cable axes.

Each signal contact 206 includes a contact body 270 extending between a mating end 272 and a terminating end 274. The contact body 270 extends along a contact axis. Optionally, the contact axis is parallel to the corresponding cable axis. In an exemplary embodiment, the contact body 270 is stamped and formed as part of the leadframe 240. The contact bodies 270 of the leadframe 240 are generally arranged in a leadframe plane parallel to the sides 250, 252 of the wafer body 242. The signal contact 206 includes a spring beam 276 at the mating end 272. The spring beam 276 is deflectable and configured to be mated with a corresponding spring beam of the second signal contact 306 (shown in FIG. 1). In various embodiments, the spring beam 276 is generally aligned with the main portion of the contact body 270. In an exemplary embodiment, the signal contact 206 includes a solder pad 278 at the terminating end 274 for soldering or welding to the corresponding signal conductor 500, 502 of the cable 202.

Figure 5:
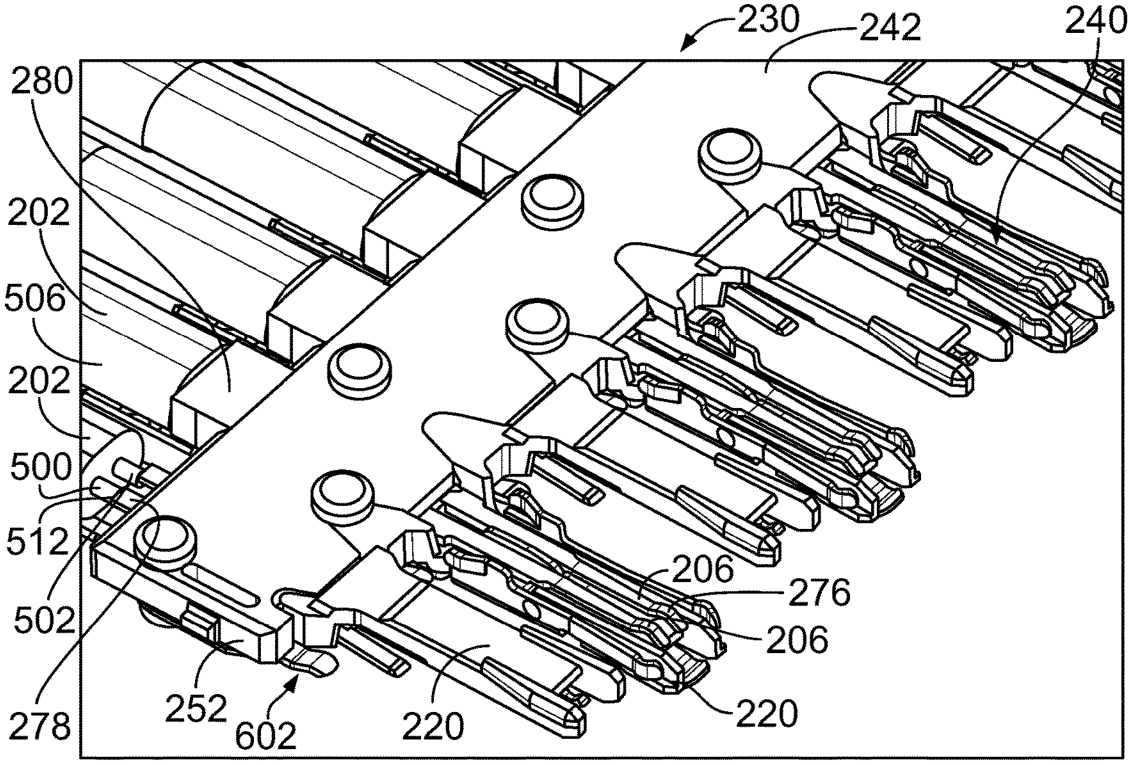
FIG. 5 is a perspective view of a portion of the wafer assembly in accordance with an exemplary embodiment during another stage of assembly.

FIG. 5 is a perspective view of a portion of the wafer assembly 230 in accordance with an exemplary embodiment during another stage of assembly. FIG. 5 shows the cables 202, the leadframe 240, the dielectric wafer body 242, the towers 220, conductor supports 280, and the second ground frame 602. After the conductors 500, 502 of the cables 202 terminated to the solder pads 278 of the signal contacts 206, the conductor supports 280 are added to support the termination in the termination region. The conductor supports 280 provide strain relief for the conductors 500, 502. In various embodiments, the conductor supports 280 are molded in place over the conductors 500, 502 and the solder pads 278. The conductor supports 280 may be acrylic or epoxy blocks connected to the solder pads 278 and the signal conductors 500, 502. The ferrules 400 (shown in FIG. 3) are configured to surround the conductor supports to provide shielding along the signal paths, such as along the termination between the signal conductors 500, 502 and the solder pads 278.

In an exemplary embodiment, the second ground frame 602 is attached to the second side 252 of the wafer body 242. The second ground frame 602 extends along the towers 220 to provide shielding for the spring beams 276 of the signal contacts 206. The ferrules 400 are configured to be electrically connected to the second ground frame 602.

Figure 6:
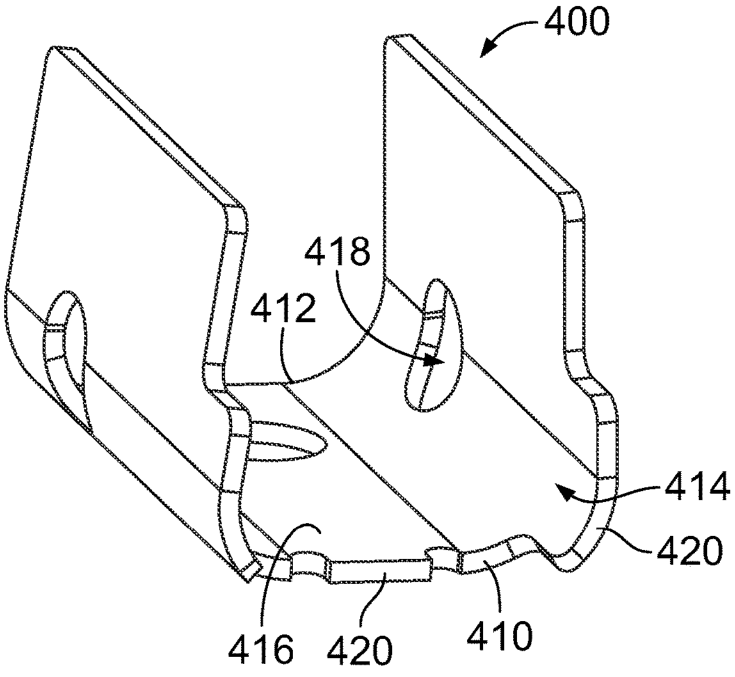
FIG. 6 is a perspective view of the ferrule in accordance with an exemplary embodiment shown in an uncrimped state.

FIG. 6 is a perspective view of the ferrule 400 in accordance with an exemplary embodiment shown in an uncrimped state. The ferrule 400 is manufactured from a conductive material, such as a metal material. In an exemplary embodiment, the ferrule 400 is a stamped and formed part. In an exemplary embodiment, the ferrule 400 is separate and discrete from the first ground frame 600 and separate and discrete from the second ground frame 602 and configured to be electrically connected to the ground frames 600. 602 during assembly. However, in alternative embodiments, the ferrule 400 may be integral with the first ground frame 600, such as being stamped and formed with the first ground frame 600 or the ferrule 400 may be integral with the second ground frame 602, such as being stamped and formed with the second ground frame 602. In other various embodiments, a portion of the ferrule 400 may be integral with the first ground frame 600 and a portion of the ferrule 400 may be integral with the second ground frame 602, such respective portions being formed around the cable and connected to each other during assembly. For example, tab-like portions may extends rearward of the ground frames 600, 602 to be formed and extend along all sides of the cable 202 and the termination region. In an exemplary embodiment, the ferrule 400 is pre-formed into a generally U-shaped piece for attachment to the corresponding cable 202, and is configured to be crimped around the cable 202 into a generally oval-shaped or obround part around the cable 202. For example, edges of the ferrule 400 may be folded inward or wrapped around the cable 202 to form the soler ferrule 400 around the cable 202.

The ferrule 400 extends between a front 410 and a rear 412. The ferrule 400 surrounds a ferrule chamber 414 defined by an interior surface 416 of the ferrule 400. Solder may be applied to the interior surface 416 for electrical connection to the cable 202. The ferrule chamber 414 is open between the front 410 and the rear 412. In an exemplary embodiment, the ferrule 400 includes openings 418, such as to receive the solder or to provide relief for the solder during application.

In an exemplary embodiment, the ferrule 400 includes shield connecting elements 420 at the front 410. The shield connecting elements 420 are configured to be connected to the ground frames 600, 602 (shown in FIG. 3). The shield connecting elements 420 define multiple points of contact with the ground frames 600, 602. The shield connecting elements 420 may be soldered or welded to the ground frames 600, 602. In various embodiments, the shield connecting elements 420 may be protrusions, tabs or beams extending from the front of the ferrule 400. Other types of shield connecting elements 420 may be used in alternative embodiments.

Figure 7:
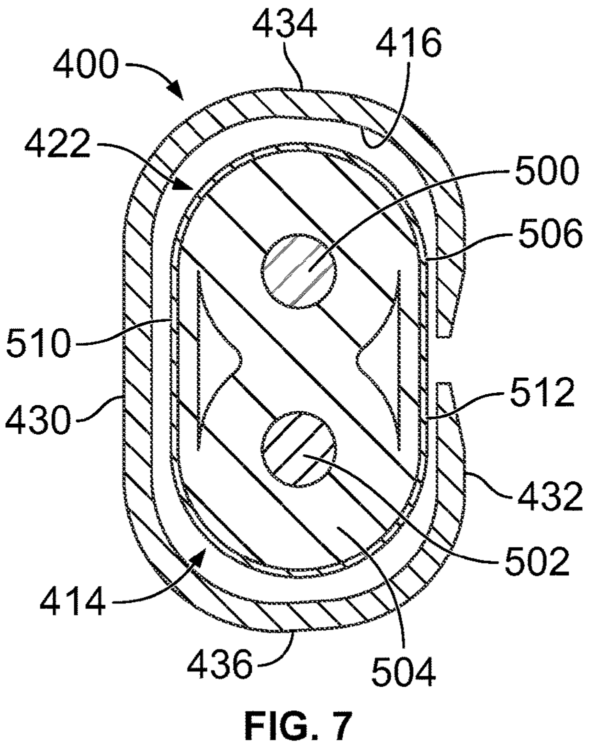
FIG. 7 is a front view of the cable assembly showing the ferrule positioned around the cable in accordance with an exemplary embodiment.
Figure 8:
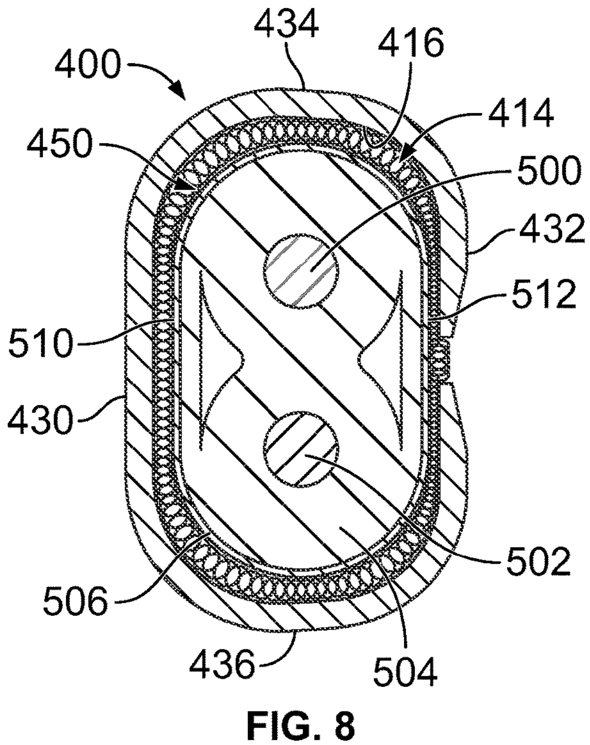
FIG. 8 is a front view of the cable assembly showing the ferrule positioned around the cable with a solder layer of solder material between the ferrule and the cable in accordance with an exemplary embodiment.

FIG. 7 is a front view of the cable assembly 228 showing the ferrule 400 positioned around the cable 202. FIG. 8 is a front view of the cable assembly 228 showing the ferrule 400 positioned around the cable 202 with a solder layer 450 of solder material between the ferrule 400 and the cable 202.

In an exemplary embodiment, during assembly, the ferrule 400 is formed around the cable 202. For example, the ferrule 400 may be crimped around the cable 202. In an exemplary embodiment, the ferrule 400 does not physically contact the cable 202 during the forming process. In an exemplary embodiment, the ferrule 400 does not deform the cable 202 during the crimping process. For example, the cable 202 is not squeezed or compressed by the ferrule 400 when the ferrule 400 is crimped into the final shape. As such, the ferrule 400 does not affect the signal integrity of the signals passing through the cable 202. The ferrule 400 does not change the positioning of the cable shield 506 relative to the signal conductors 500, 502 the ferrule 400 does not change the shape of the insulator 504 between the cable shield 506 and the signal conductors 500, 502.

In an exemplary embodiment, the ferrule 400 is formed in the oval or obround shape to form the ferrule chamber 414. The ferrule 400 may wrapped generally entirely around the ferrule chamber 414 to provide 360° covering for the cable 202. For example, the edges of the ferrule 400 may be positioned in close proximity to each other. Optionally, the edges of the ferrule 400 may touch each other. In various embodiments, the edges of the ferrule 400 may overlap each other. In various embodiments, a slight opening may be provided between the edges of the ferrule 400. The solder layer 450 may span across the opening between the edges to provide 360° shielding around the cable 200.

The cable 202 is positioned in the ferrule chamber 414. In an exemplary embodiment, the ferrule 400 has a perimeter that is larger than a perimeter of the cable 202 (for example, larger than the perimeter of the cable shield 506) such that a gap 422 is formed between the outer surface of the cable shield 506 in the interior surface 416 of the ferrule 400. The gap 422 provides a space for the solder layer 450. The solder material is positioned in the gap 422 to define an electrical path between the cable shield 506 and the ferrule 400. The solder layer 450 may fill the gap 422. In various embodiments, the solder material is loaded into the gap 422 after the ferrule 400 is formed around the cable 202. In other various embodiments, the solder layer 450 may be applied to the interior surface 416 prior to performing the ferrule 400. The solder layer 450 may be squeezed into physical contact with the cable shield 506. Excess solder material may be squeezed out of the ferrule 400 during the forming to avoid deforming the cable 202 during the forming or crimping process.

In an exemplary embodiment, the ferrule 400 includes a first side 430, a second side 432, a first end 434 between the first and second sides 430, 432, and a second end 436 between the first and second sides 430, 432. In various embodiments, the first end 434 may be provided at the top of the ferrule 400 and the second end 436 may be provided at the bottom of the ferrule 400. Optionally, the sides 430, 432 may have generally flat or planar portions that extend along the sides 510, 512 of the cable 202. The ends 434, 436 are curved between the sides 430, 432, such as at the corners. The ferrule 400 may be elongated such that the sides 430, 432 are longer than the ends 434, 436. The ferrule 400 may have other shapes in alternative embodiments. For example, the sides 430, 432 may be curved, such as at a radius of curvature that is different from the radius of curvature of the ends 434, 436. In an exemplary embodiment, both sides 430, 432 are electrically connected to the cable 202 by the solder layer 450 and both ends 434, 436 are electrically connected to the cable 202 by the solder layer 450. As such, grounding paths are provided between the ferrule 400 and the cable shield 506 at multiple points and on all four sides (for example, top, bottom, right, left) of the cable assembly 228. Optionally, the solder layer 450 may form a continuous circumferential grounding path (for example, 360°) between the cable shield 506 and the ferrule 400.

Figure 9:
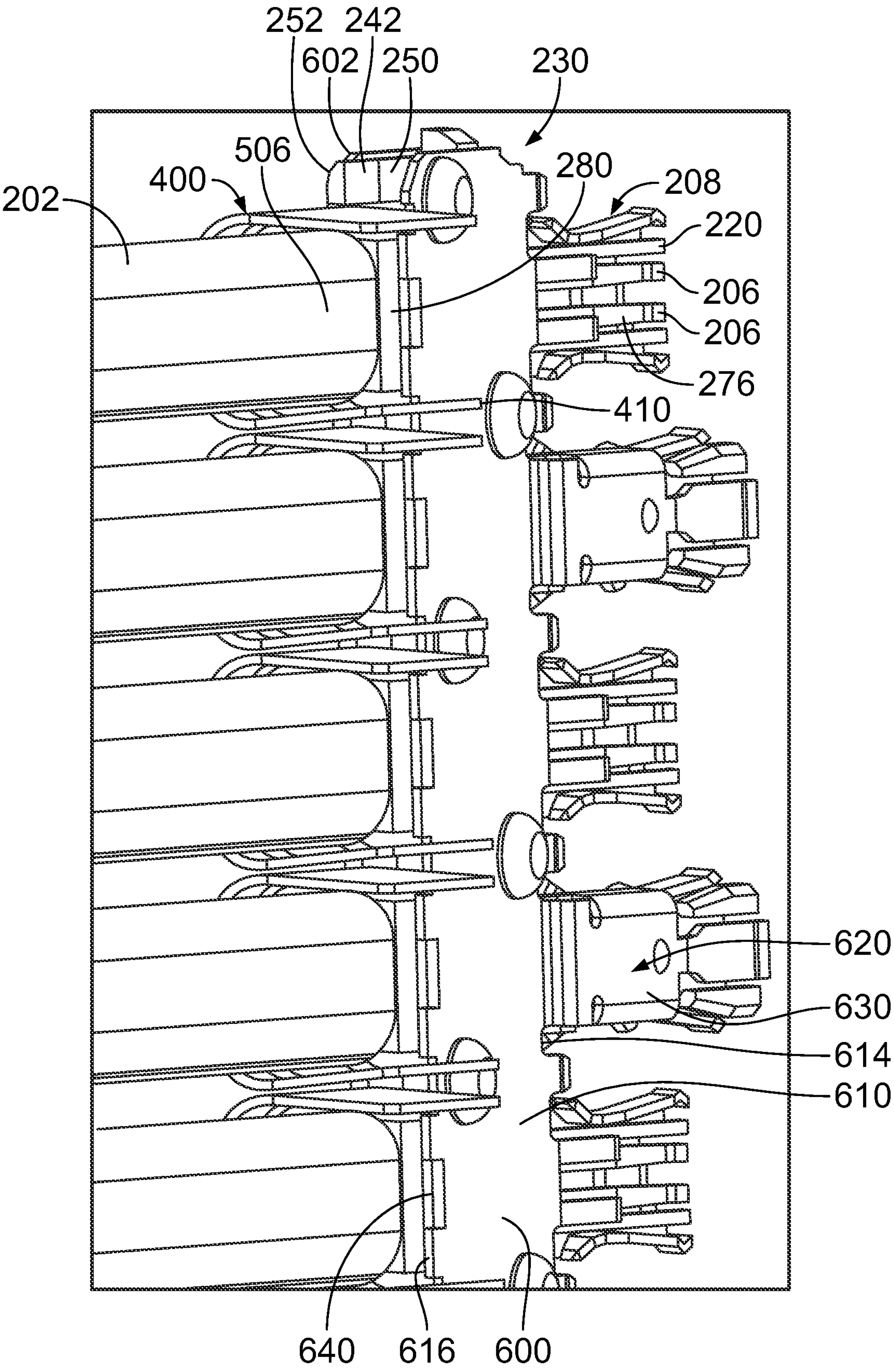
FIG. 9 is a perspective view of a portion of the wafer assembly in accordance with an exemplary embodiment during an intermediate stage of assembly.
Figure 10:
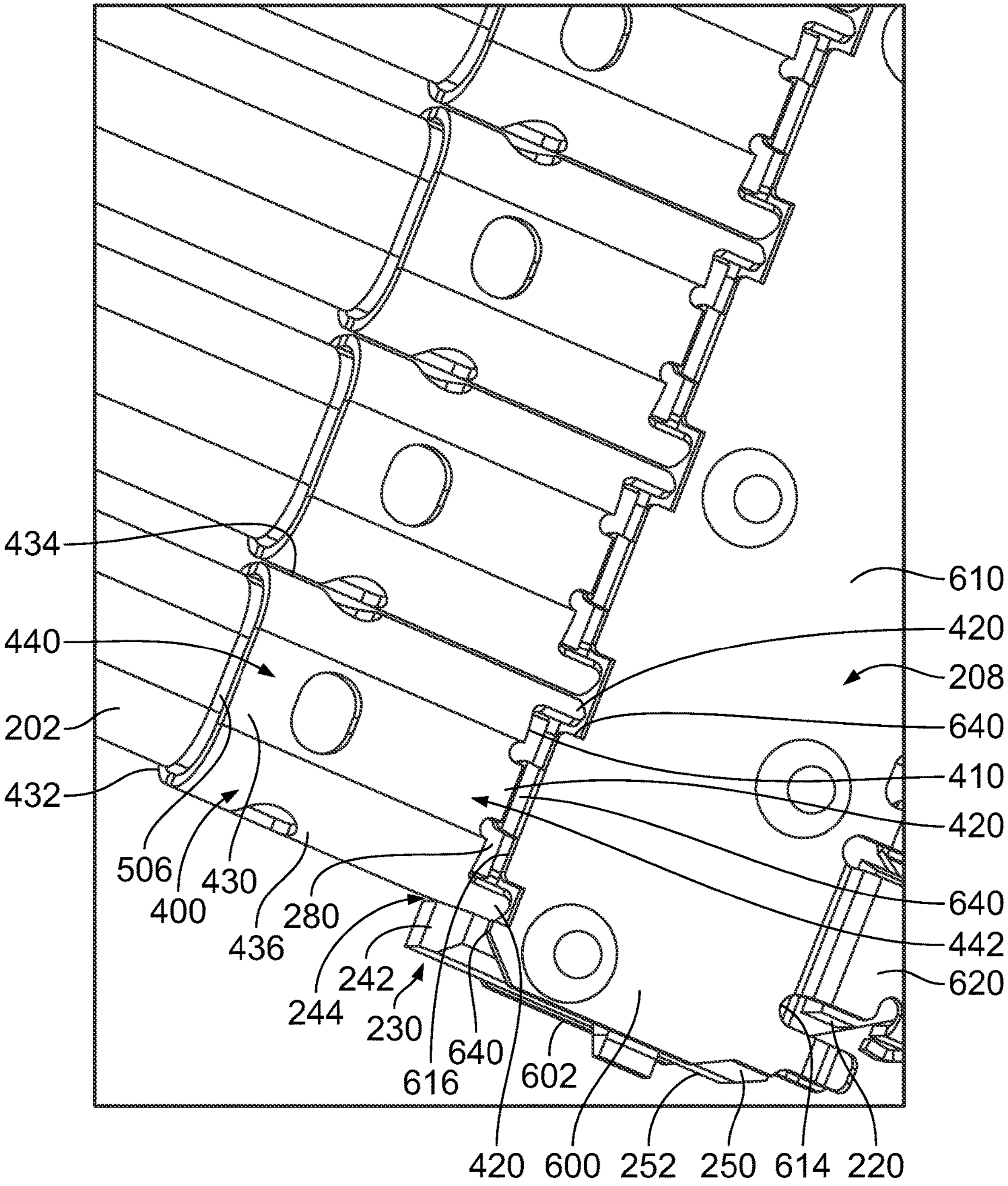
FIG. 10 is a perspective view of a portion of the wafer assembly in accordance with an exemplary embodiment during an intermediate stage of assembly.

FIG. 9 is a perspective view of a portion of the wafer assembly 230 in accordance with an exemplary embodiment during an intermediate stage of assembly. FIG. 10 is a perspective view of a portion of the wafer assembly 230 in accordance with an exemplary embodiment during an intermediate stage of assembly. FIG. 9 illustrates the ferrules 400 initially loaded into position around the cables 202 prior to crimping the ferrules 400 around the cables 202. FIG. 10 illustrates the ferrules 400 formed around the cables 202. FIG. 10 illustrates the ferrules 400 electrically connected to the shield structure 208, such as to the first ground frame 600 and the second ground frame 602.

The first and second ground frames 600, 602 are attached to the wafer body 242. The first ground frame 600 is attached to the first side 250 of the wafer body 242 and the second ground frame 602 is attached to the second side 252 of the wafer body 242. The first and second ground frames 600, 602 extend along the towers 220 to provide shielding for the spring beams 276 of the signal contacts 206. The ferrules 400 are electrically connected to the first and second ground frames 600, 602 to provide a grounding bridge between the cable shield 506 and the first and second ground frames 600, 602. The ferrules 400 maintain the 360° shielding around the signal conductors 500, 502 of the cables 202 through the transition and termination area to the signal contacts 206. In an exemplary embodiment, the first and second ground frames 600, 602 are configured to be electrically connected to each of the ferrules 400 to electrically common each of the ferrules 400, and thus each of the cable shields 506.

In an exemplary embodiment, the ground frame 600 includes a ground plate 610, ground shields 620 extending from the ground plate 610 for shielding the mating ends of the signal contacts 206, and termination tabs 640 extending from the ground plate 610 for connection to the cable shields 506. The termination tabs 640 may extend along portions of the termination region, such as along the top and/or sides and/or bottom of the termination region. In the illustrated embodiment, the shield portion 630 of the ground shield 620 is C-shaped. The shield portion 630 may have other shapes in alternative embodiments. The ground plate 610 forms a main body of the ground frame 600. The ground plate 610 may be planar. The ground plate 610 is attached to the wafer body 242, such as to the first side 250 of the wafer body 242. The ground plate 610 extends between a front edge 614 and a rear edge 616. The ground shields 620 extend from the front edge 614 of the ground plate 610 and the termination tabs 640 extend from the rear edge 616 of the ground plate 610.

Each termination tab 640 extends rearward from the ground plate 610 to couple to the corresponding ferrule 400. For example, the termination tabs 640 may interface with the shield connecting elements 420. In an exemplary embodiment, the termination tabs 640 may be soldered or welded to the shield connecting elements 420 to create a direct electrical connection between the ferrule 400 and the ground frame 600 (same type of connection with the second ground frame 602). In an exemplary embodiment, the wafer body 242 includes pockets 244 in the rear of the wafer body 242. The pockets 244 receive the front 410 of the ferrule 400. For example, the front 410 of the ferrule 400 may be plugged into the pockets 244 at the rear of the wafer body 242 to position the ferrule 400 relative to the wafer assembly 230. The shield connecting elements 420 may be plugged into the pockets 244. In an exemplary embodiment, the shield connecting elements 420 are provided at the first and second sides 430, 432 and/or the first and second ends 434, 436 to provide multiple points of contact with the first ground frame 600 and multiple points of contact with the second ground frame 602.

During assembly, the ferrule 400 is crimped around the cable 202 to position the ferrule 400 along the termination zone. The ferrule 400 surrounds the conductor support 280, which is used to isolate the terminating portions of the first and second signal conductors from the ferrule 400. The ferrule 400 extends forward of the end of the cable 202 to make electrical connection with the ground frames 600, 602. For example, the shield connecting elements 420 may be welded to or soldered to the terminating tabs 640 of the ground frames 600, 602. In an exemplary embodiment, the first side 430 is generally aligned with and coupled to the first ground frame 600 and the second side 432 is generally aligned with and coupled to the second ground frame 602. For example, the flat portions of the sides 430, 432 may be generally coplanar with the ground plates of the ground frames 600, 602. In an exemplary embodiment, the first ground frame 600 is coupled to all of the ferrules 400 to electrically common each of the ferrules 400 and the cable shields 506 and the second ground frame 602 is coupled to all of the ferrules 400 to electrically common each of the ferrules 400 and the cable shields 506.

The ferrule 400 completely surrounds the cable shield 506 of the corresponding cable 202 on all four sides of the cable 202 without physically touching the cable shield 506. In an exemplary embodiment, after forming, the ferrule 400 has a curved profile following a curvature of the corresponding cable shield 506 and spaced apart from the cable shield 506. The solder layer 450 (shown in FIG. 8) fills the void or gap between the cable shield 506 and the ferrule 400 to electrically connect the cable shield 506 and the ferrule 400. The solder layer 450 may be pre-applied to the interior surface of the ferrule 400 or may be injected into the gap, such as through the openings. The solder layer 450 may be reflowed to make an electrical connection between the cable shield 506 and the ferrule 400. In an exemplary embodiment, the ferrule 400 is crimped around the end of the cable 202 without compressing the cable 202.

The ferrule 400 forms a shield pocket around the cable 202. The ferrule 400 continues the generally circumferential shielding provided by the cable shield 506 forward of the stripped end of the cable 202, such as along the stripped portions of the signal conductors (for example, the termination portions of the signal conductors) to provide shielding around the termination zone. The ferrule 400 provides shielding along both sides, as well as the top and the bottom of the signal conductors. The ferrule 400 provides shielding between the cables 202 (for example, above and below the cables). The ferrule 400 provides shielding along the conductor support 280. For example, the end of the cable 202 is received in a rear portion 440 of the ferrule 400 and the conductor support 280, which surrounds the terminating portions of the first and second signal conductors, is located in a front portion 442 of the ferrule 400. The shield connecting elements 420 may extend along the conductor support 280. The ferrule 400 forms part of the shield structure 208 of the wafer assembly 230 to provide efficient shielding around the signal paths as the signals transition between the cable 202 and the signal contacts 206. The ferrules 400 provide shielding not only along the two sides, but also along the top and the bottom (for example, between the cables) to improve the shielding and improve signal integrity of the system.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the invention without departing from its scope. Dimensions, types of materials, orientations of the various components, and the number and positions of the various components described herein are intended to define parameters of certain embodiments, and are by no means limiting and are merely exemplary embodiments. Many other embodiments and modifications within the spirit and scope of the claims will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

What is claimed is:

1. A wafer assembly for an electrical connector, the wafer assembly comprising:

a leadframe having signal contacts extending between mating ends and terminating ends, the signal contacts having main bodies between the mating ends and the terminating ends;

cables rearward of the leadframe, each cable including first and second signal conductors arranged as a signal pair, the first and second signal conductors being terminated to the terminating ends of the corresponding signal contacts, each cable includes a cable shield surrounding the conductors to provide shielding for the signal pair and being separated from the conductors by a dielectric insulator;

a wafer body holding the main bodies of the signal contacts, the wafer body having a front, a rear, a first side between the front and the rear, and a second side between the front and the rear, the cables located rearward of the rear of the wafer body, wherein the wafer body supports the main bodies of the signal contacts, the mating ends extending forward of the front of the wafer body, the terminating ends extending rearward of the rear of the wafer body;

a first ground frame attached to the first side of the wafer body to provide electrical shielding for the leadframe, the first ground frame including first ground shields providing shielding for the mating ends of the corresponding signal contacts, the first ground frame being spaced apart from the cable shields; and a second ground frame attached to the second side of the wafer body to provide electrical shielding for the leadframe, the second ground frame being spaced apart from the cable shields; and ferrules extending across the space between the cable shields and the first and second ground frames to provide shielding for the signal pairs and the terminating ends of the corresponding signal contacts, the ferrules closely conforming to and surrounding the cable shields at the ends of the corresponding cables, each ferrule having a solder layer inside the ferrule soldered to the cable shield of the corresponding cable, the ferrules being terminated to the first and second ground frames to electrically connect the ferrules to the first and second ground frames.

2. The wafer assembly of claim 1, wherein each ferrule includes shield connecting elements at a front of the ferrule, the shield connecting elements being coupled to the first and second ground frames.

3. The wafer assembly of claim 2, wherein the shield connecting elements are one of welded to or soldered to the first and second ground frames.

4. The wafer assembly of claim 1, wherein each ferrule completely surrounds the cable shield of the corresponding cable on all four sides of the cable with only incidental physical contact with the cable shield.

5. The wafer assembly of claim 1, wherein the ferrule is crimped around the end of the cable without compressing the cable.

6. The wafer assembly of claim 1, wherein the ferrule has a ferrule chamber receiving the end of the cable, a gap being defined in the ferrule chamber between an interior surface of the ferrule and the cable shield, the solder layer filling the gap to electrically connect the cable shield to the ferrule.

7. The wafer assembly of claim 1, wherein the ferrule includes openings to fill the ferrule with the solder layer.

8. The wafer assembly of claim 1, wherein the wafer body includes pockets in the rear, the pockets receiving front ends of the ferrules.

9. The wafer assembly of claim 1, wherein each ferrule includes a first side, a second side, a first end between the first and second sides, and a second end between the first and second sides, the first side being generally aligned with and coupled to the first ground frame, the second side being generally aligned with and coupled to the second ground frame.

10. The wafer assembly of claim 9, wherein the first side and the second side have flat surfaces, the first end and the second end being curved between the first and second sides to form an obround ferrule chamber that receives the end of the cable.

11. The wafer assembly of claim 9, wherein each ferrule includes a front portion and a rear portion, the end of the cable received in the rear portion, terminating portions of the first and second signal conductors located in the front portion.

12. The wafer assembly of claim 11, further comprising a conductor support holding the terminating portions of the first and second signal conductors, the conductor support received in the front portion and isolating the terminating portions of the first and second signal conductors from the ferrule.

13. The wafer assembly of claim 1, wherein the first ground frame is electrically connected to all of the ferrules to electrically common each of the ferrules and the cable shields, and wherein the second ground frame is electrically connected to all of the ferrules to electrically common each of the ferrules and the cable shields.

14. The wafer assembly of claim 1, wherein each ferrule has a curved profile following a curvature of the corresponding cable shield, the solder layer filling a gap between the cable shield and an interior surface of the ferrule.

15. The wafer assembly of claim 1, wherein ends of the signal conductors are terminated to the terminating ends of the signal contacts at a termination region, the ferrule encapsulating the termination region as the ferrule extends between the cable shield and the first and second ground frames.

16. A cable assembly for a wafer assembly, the cable assembly comprising:

a cable including first and second signal conductors arranged as a signal pair, terminating ends of the first and second signal conductors extending from an end of the cable for termination to terminating ends of signal contacts of the wafer assembly, the cable includes a cable shield providing shielding for the signal pair, the cable shield exposed at the end of the cable beyond a cable jacket of the cable; and a ferrule formed in an obround shape surrounding a ferrule chamber, the ferrule chamber receiving the end of the cable and the exposed ends of the first and second signal conductors, the ferrule having a circumferential gap in the ferrule chamber surrounding the end of the cable, the ferrule configured to be terminated to a first ground shield and a second ground shield of the wafer assembly on opposite sides of the wafer assembly; and a solder layer in the gap on an interior surface of the ferrule, the solder layer electrically connecting the cable shield to the ferrule.

17. The cable assembly of claim 16, wherein the ferrule completely surrounds the cable shield on all four sides of the cable without physically touching the cable shield and capacitively coupled to the cable shield.

18. The cable assembly of claim 16, wherein the ferrule is crimped around the cable making electrical contact to the cable shield in multiple locations.

19. The cable assembly of claim 16, wherein the ferrule is crimped around the cable to encapsulate the end of the cable shield without compressing the cable.

20. The cable assembly of claim 16, wherein the ferrule includes a first side, a second side, a first end between the first and second sides, and a second end between the first and second sides, wherein the first side and the second side have flat surfaces, and wherein the first end and the second end are curved between the first and second sides to form the obround ferrule chamber that receives the end of the cable, the solder layer being electrically connected to the interior surface of the ferrule at the first side, the second side, the first end and the second end.

21. An electrical connector assembly comprising:

a housing having a mating interface configured to be mated with a mating electrical connector assembly, the housing having a cavity; and wafer assemblies received in the cavity and coupled to the housing, the wafer assemblies arranged in a wafer stack, each wafer assembly including a leadframe, a wafer body holding the leadframe, cables coupled to the leadframe, a first ground frame coupled to the wafer body to provide electrical shielding for the leadframe, a second ground frame coupled to the wafer body to provide electrical shielding for the leadframe, and ferrules surrounding the ends of the cables, wherein each ferrule has a solder layer along an interior of the ferrule, the solder layer being coupled to a cable shield of the corresponding cable to electrically connect the cable shield to the ferrule, each ferrule being terminated to the first and second ground frames to electrically connect the ferrule to the first and second ground frames, and wherein the first ground frame is configured to be coupled to the mating electrical connector assembly and the second ground frame is configured to be coupled to the mating electrical connector assembly.

22. The electrical connector assembly of claim 21, wherein each ferrule includes a first side, a second side, a first end between the first and second sides, and a second end between the first and second sides, wherein the first side and the second side have flat surfaces, and wherein the first end and the second end are curved between the first and second sides to form the obround ferrule chamber that receives the end of the cable, the solder layer being electrically connected to the interior surface of the ferrule at the first side, the second side, the first end and the second end.

* * * * *